Jan. 2, 1951          M. C. GUEST          2,536,170
ADAPTER FOR MOUNTING CAMERAS UPON TRIPODS
Filed June 27, 1949
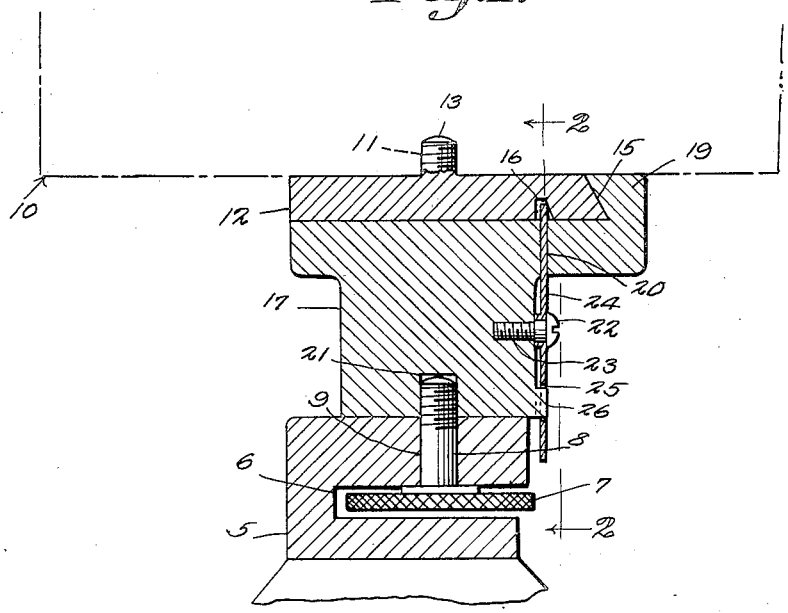
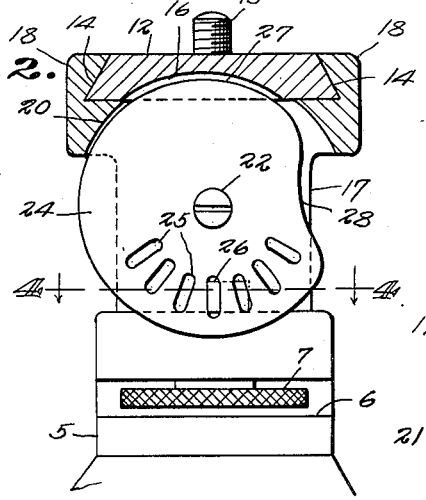
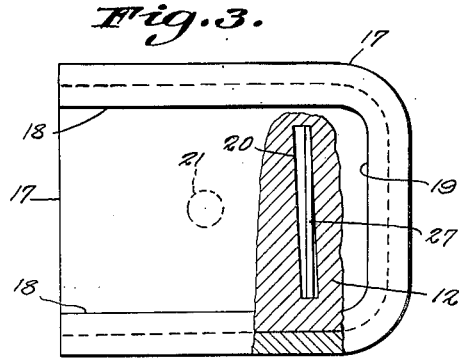
M. C. Guest
INVENTOR
BY *C. A. Snow & Co.*
ATTORNEYS.

Patented Jan. 2, 1951

2,536,170

UNITED STATES PATENT OFFICE 2,536,170

ADAPTER FOR MOUNTING CAMERAS UPON TRIPODS

Maurice C. Guest, United States Air Force

Application June 27, 1949, Serial No. 101,552

3 Claims. (Cl. 248—177)

This invention relates to an adapter for mounting a camera upon a tripod.

Conventionally, a camera is formed with a threaded opening in its base, a tripod having an upwardly extended thumb screw threadable into said opening for the purpose of securely mounting the camera upon the tripod.

This arrangement has been found to be rather unhandy, especially when large cameras or tripods are involved, and accordingly, it is an important object of the present invention to provide a means for mounting a camera upon a tripod which will permit the attachment of the camera to the tripod head with speed and ease, and which will permit the detachment thereof with equal facility.

Another important object is to provide a device as stated which will permit the speedy and secure mounting of a camera upon a tripod, without regard to the size of said camera or tripod.

Another important object is to provide a means of the type stated which will hold the camera upon the tripod with complete steadiness.

Another important object is to provide a device as stated wherein the conventional construction of the camera and the tripod head need not be varied in any particular, the invention being in the nature of an adapter interposed between the camera base and the tripod head as they are now conventionally constructed.

Briefly, the invention comprises a device having a beveled plate adapted to be secured to the base of a camera; an adapter body formed with a beveled recess for receiving said plate and adapted for mounting upon the tripod head; and a cam lock of novel formation and operation extendable into locking engagement with the plate and adapter body.

Referring to the drawings:

Fig. 1 is a vertical section through an adapter constructed in accordance with the invention as it appears when operatively positioned to secure a camera upon a tripod.

Fig. 2 is a section on line 2—2 of Fig. 1.

Fig. 3 is a top plan view of the adapter body.

Fig. 4 is a section on line 4—4 of Fig. 2.

Referring to the drawings in detail, a conventional tripod head is designated 5 and includes the inwardly extended slot 6 in which is positioned the knurled head 7 of the screw 8 that extends upwardly above the horizontal upper surface of said tripod head, the screw being rotatable in opening 9 formed in the tripod head.

A camera is indicated in Fig. 1 in dotted lines, this camera being designated 10 and being intended to designate any conventional camera, of any size or design, such camera being equipped with means for receiving the tripod screw 8, in the form of the threaded opening 11 formed in the base of the camera.

Conventionally, a camera 10 is secured directly to the tripod head 5, by threading of the rotatable thumb screw 8 into the threaded opening 11 formed in the base of the camera. However, the invention aims to provide an adapter adapted to be interposed between the camera base and the tripod head, so as to permit said camera to be secured to the head more speedily than has heretofore been the case, while at the same time insuring the steady supporting of said camera upon the tripod.

To this end, I provide the beveled plate 12, having integral therewith or otherwise rigidly secured to its upper surface, the upwardly extended threaded stud 13 adapted to be threaded into the opening 11 of the camera. It will be understood at this point that the plate 12 would be secured to the camera 10 more or less permanently, the plate being flat and presenting no projections which would tend to snag associated objects. This would be entirely possible, since the plate would be small and would add little weight or bulk to the camera 10.

In any event, the plate 12 is of approximately rectangular outer configuration, having beveled side walls 14 (Fig. 2) and a beveled front wall 15 (Fig. 1).

In the under surface of the plate, adjacent the front wall 15, there is formed a transversely disposed narrow groove 16, which is pitched at a slight angle for a purpose to be made apparent hereinafter.

The invention also includes an adapter body 17 having formed in its upper surface the recess into which is extendable plate 12, and to this end, said recess is open at one end as clearly shown in Fig. 3, the recess being formed with beveled side walls 18 and a beveled front wall 19 closing the front end of the recess. Thus, the three sided recess having the beveled walls is adapted to receive the plate 12 having the side and front walls beveled correspondingly and when the plate 12 is fully extended into the recess as seen in Fig. 1, it will be securely engaged therein against movement, thus to hold the camera securely upon the tripod.

The adapter body 17 is formed with a transversely disposed slot 20 (Fig. 2) which extends from the recess downwardly, opening slightly in advance of the front wall of the body proper (see Fig. 1). The slot 20 is adapted to register substantially with the pitched slot 16 of the plate 12.

Formed in the bottom surface of the adapter body 17 is the threaded recess 21 receiving the thumb screw 8 of the tripod head. Thus, the thumb screw 8 is adapted to be threaded into the bottom recess 21, so that the adapter body 17 can be mounted upon the tripod head more or less permanently exactly as the plate 12 is more or less permanently attached to the camera 10.

A screw 22 comprising a pin or hub on which is rotatably mounted a cam to be described hereinafter, is threaded into threaded opening 23 formed in the front surface of the body 17, and rotatably mounted upon the screw 22 is the cam 24 formed of quite thin spring metal material, said cam being formed with the marginal locking indentations 25 in any of which is receivable the locking lug 26 formed upon the body 17. Thus, one using the device is enabled by reason of the inherent springiness of the cam, to pull the marginal portion of the cam away from the locking lug 26, so as to free the cam for rotatable movement. Assuming that the cam has been rotatably adjusted to a desired position, it is released to spring back into a position in which the locking lug 26 will engage in a selected opening or indentation 25. Thus, the cam is locked in selected positions to which rotated.

The cam is formed with a high surface 27 and a low surface 28, and as will be apparent from Fig. 2, when the high surface 27 is in the uppermost position, said high surface will move into the pitched slot 16, and will lock the plate 12 in the recessed upper surface of the adapter body 17.

In this connection, as previously noted the pitch of the slot 16 is for a particular purpose. The slot can be pitched either in the direction of its length or in the direction of its heighth, or both, so long as it will present a surface disposed at an angle to the path of movement of the cam as the high portion 27 of the cam moves into said groove or slot 16. Thus, as the cam is rotatably adjusted, the cam will bear against the pitched surface of the groove 16, and this will cause the plate 12 to be forced to the right in Fig. 1 so as to be forced positively against the front wall of the recess of the adapter body, thus to lock the plate securely in position in the recess of said body to hold the camera steadily and firmly upon the tripod.

It will be seen from the above that mounting the camera upon the tripod is an operation requiring no more than the insertion of the plate 12 in the recess of the adapter body, and the partial rotation of the cam 24 to lock the plate to the adapter body. Removal of the camera from the tripod is accomplished with equal facility, simply by partial rotation of the cam in the opposite direction so that the low portion 28 is uppermost, at which time the cam will have cleared the groove 16 completely thus to free the plate 12 for removal from the recess of the adapter body. In either extreme position of the cam, the cam can be locked against movement by means of the cooperating locking means 26, 25.

What is claimed is:

1. An adapter for mounting a camera upon a tripod comprising a plate having beveled side walls and a beveled front wall and adapted for fixed connection to the base of a camera, an adapter body adapted for fixed connection to a tripod head and having formed in its upper surface a recess open at one end and closed at the other end, said closed end and sides of the recess being beveled correspondingly to the bevel of the plate, there being a transversely disposed groove formed in the under surface of the plate and a transversely disposed slot formed in the adapter body, a cam disc rotatably mounted upon the adapter body and extending into the slot, and said cam disc adapted to be rotated for movement into the groove to lock the plate within the recess.

2. An adapter for mounting a camera upon a tripod comprising a plate adapted for fixed connection to the base of a camera and having beveled side walls and a beveled front wall, an adapter body adapted for fixed connection to the head of a tripod and having a recess formed in its upper surface for receiving the plate, said recess being open at one end and having beveled side walls and a beveled front wall, a plate having formed in its under surface a transversely disposed groove, the body having a transversely disposed slot substantially in register with the groove, said groove being pitched at a slight angle relative to the slot, a cam disc rotatably mounted upon the adapter body and extending into the slot, said cam disc having a low portion and a high portion, and the high portion of the cam disc being adapted to move into the groove of the plate and to bear against the pitched surface of said groove, for locking the plate against movement relative to the adapter body and wedging the plate in the direction of the closed end of the recess of the adapter body.

3. An adapter for mounting a camera upon a tripod comprising a plate adapted for fixed connection to the base of a camera, said plate having beveled walls, an adapter body adapted for fixed connection to a tripod head, said adapter body having a recess for receiving the plate and said recess being formed with beveled walls engageable with the beveled walls of the plate, the plate having a cam receiving groove extended transversely thereof and formed in its under surface, said groove being pitched at a slight angle, the adapter body having a transversely extended slot, a cam disc rotatably mounted upon the adapter body and extending through the slot, said cam disc having a low portion and a high portion, whereby on rotatable movement of the cam disc the high portion is adapted to move into the groove and bear against the pitched surface thereof to wedge the plate against the walls of the recess, and means for locking the cam disc in selected positions to which rotatably adjusted.

MAURICE C. GUEST.

REFERENCES CITED

The following references are of record in the file of this patent:

UNITED STATES PATENTS

| Number | Name | Date |
| --- | --- | --- |
| 534,912 | Perry | Feb. 26, 1895 |
| 1,425,807 | Thalhammer | Aug. 15, 1922 |
| 2,351,386 | Zucker | June 13, 1944 |